Figure 1:
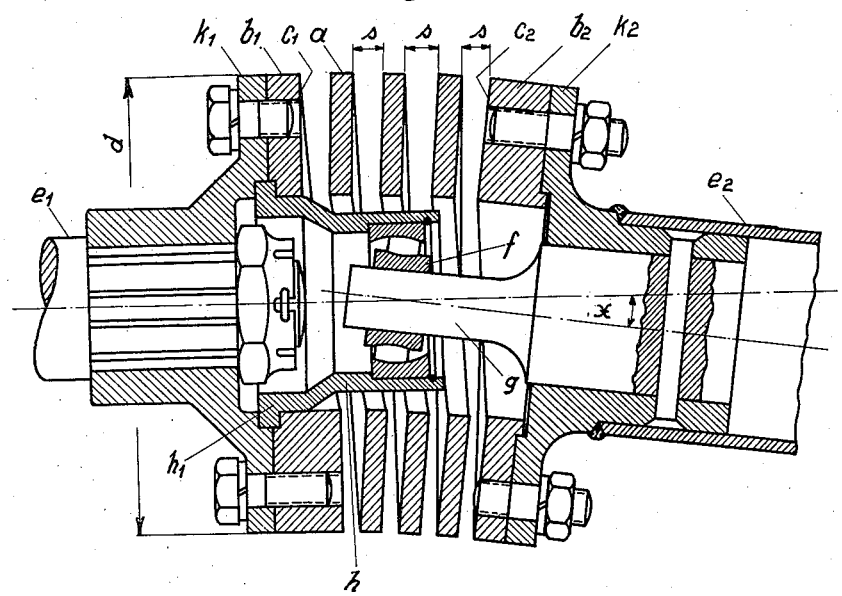

June 17, 1941.   R. DÖME ET AL   2,245,764
UNIVERSAL JOINT
Filed Nov. 30, 1937

Inventors:
R. Döme and
P. Jaross.
By E. F. Wenderoth atty

Patented June 17, 1941

2,245,764

UNITED STATES PATENT OFFICE 2,245,764

UNIVERSAL JOINT

Robert Döme and Paul Jaross, Budapest, Hungary

Application November 30, 1937, Serial No. 177,378
In Hungary and Germany October 2, 1937

3 Claims. (Cl. 64—15)

This application is a companion case to applicants' application, Serial No. 177,631 filed December 1, 1937.

It has previously been proposed to connect two shafts which rotate with their axes inclined at an angle one to the other by means of a "coil spring joint" viz. a universal joint comprising a coil spring instead of by means of an ordinary universal or Hooke's joint. The former joints have the advantage that the driven shaft, even when inclined at an angle to the driving shaft, is rotated with uniform angular velocity and not with a periodically varying angular velocity as is the case when the ordinary universal joint is employed. Coil spring joints comprise a strip of spring material which is wound edgewise into the form of a coil, of which the ends are each connected to one of the shafts to be coupled together. If the two shafts are journalled in fixed positions so that the angle between the shafts cannot be varied no further support for the ends of the shafts is necessary. If, however, the relative angular inclination of two shafts is variable, or if one of the shafts is floating, as for example the Cardan shaft which is interposed between the engine and the differential gear in motor cars, it is necessary to support the ends of the shafts in the space inside the spring by means of a ball-and-socket joint, in order to prevent displacement of the shafts parallel to their axes and to ensure central running. Since a joint arranged in the driving shaft of a motor car has to transmit a varying torque the ball-and-socket joint which supports the ends of the shaft must not be disposed outside the resilient part of the spring joint in such a manner as to prevent longitudinal displacement, as has been proposed for example in the British Specification No. 2,634/1913, because this does not allow changes in the length of the axis of the spring to take place and the misplaced bearing would exert harmful stresses on the spring. It is essential for the ball-and-socket joint to allow alterations in the length of the axis of the spring to take place in order to permit torsion of the spring about its axis, because only this will ensure the elasticity of the joint when the torque varies and threby protect the driving gear from shocks. For this reason the ball-and-socket joint should be arranged in the space inside the resilient section of the joint, so as to allow longitudinal displacements, in the manner proposed in the U. S. Patent No. 1,331,748. In order to obtain the desired result, the spring must be sufficiently resilient to permit torsion about its axis. Hence, if the two shafts are inclined to one another and the axis of the spring is correspondingly bent, the spring tends to bulge outwardly under the action of the torsional stress, particularly if its pitch is too large and the spring is long.

On the other hand, if the spring is prevented from altering in length, the torsional stress, since it can neither shorten nor lengthen the spring, tends to vary its diameter. But since the radial width of the cross-section of the spring should be several times its axial thickness in order that, when transmitting torque, the spring should resist alterations in diameter, as long as the two shafts are not inclined, the spring cannot undergo any appreciable alteration in shape under the action of the torque, so that the joint also behaves like a rigid joint when the torque varies. Hence in such joints the spring has no tendency to bulge outwardly under the action of the torque. The bulging out of the helical spring which responds to alterations in torque by alterations in length is limited, according to the aforesaid United States patent, by leaving only a small gap between the hollow pin provided within the spring to receive the supporting bearing and the inner peripheral surface of the helical spring. By this means, however, not only is the bulging out of the helical spring limited but also the inclination of the two shafts to one another is restricted within such narrow limits that an angular deviation up to 15°, as is required for the Cardan shafts of motor cars, cannot be obtained. It has now been found that the bulging out of the spring when free to alter its lengths can be obviated if, in accordance with the invention, the external diameter of the spring is greater than the maximum possible compression of the spring.

Two examples of a universal joint according to the invention are illustrated in the accompanying drawing, in which—

Figure 2:
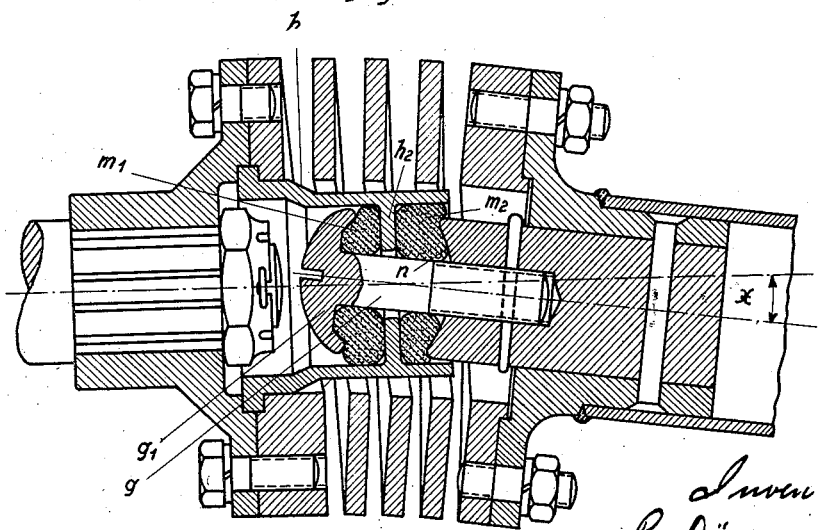

Figure 1 is a longitudinal section through the joint with the axes of the two shafts inclined at an angle, and Figure 2 is a similar section showing a different form of inner supporting joint.

Referring to the drawing, the joint comprises a helical spring $a$ of substantially rectangular cross-section. The radial width of the cross-section of the spring is about 4–6 times and preferably five times the axial thickness. The spring $a$ is preferably made in one piece with its end flanges $b_1$ and $b_2$ each of which forms a closing ring. The surfaces of the end flanges which face the spring i. e. the surfaces $c_1$ and $c_2$ are preferably helical and parallel respectively to the adjacent helical surfaces of the spring. The spring is connected by its end flanges $b_1$ and $b_2$ to the end flanges $k_1$ and $k_2$ of the shafts $e_1$ and $e_2$ which are to be coupled together. The ends of the shafts project into the interior of the spring and are supported by means of a ball-and-socket joint $f$ which does not prevent compression and extension of the spring. For this purpose the construction illustrated in the drawing is very advantageous. In this, the shaft-end $g$ of the one shaft $e_2$ is carried freely in a bore in the inner ring of a rocking roller bearing $f$ which acts as a ball-and-socket joint and is mounted in a sleeve $h$ which is attached to the end of the other shaft $e_1$. The sleeve $h$ is preferably clamped by means of a flange $h_1$ between the end flanges $k_1$ and $b_1$ of the shaft $e_1$ and the spring respectively.

According to the invention, the total distance by which the spring, which is not prevented from altering its length, can be compressed, namely the sum of all the gaps $s, s, s$ between the individual convolutions of the spring is less than the external diameter $d$ of the spring.

Any alteration in the velocity of and load on the driving shaft, at first results in a difference between the peripheral speeds of the driving and driven shafts which, until a condition of equilibrium is reached, causes torsion of the spring about its longitudinal axis. Corresponding to the torsion, the spring tends to contract or extend axially, depending on which of the two shafts is momentarily running the faster, and this axial movement is able to take place because the shaft end $g$ is able to move axially in the bearing $f$. The possible displacement of the shaft-end $g$ in the bearing $f$ is preferably as great as the maximum compression of the spring, i. e. the sum of the gaps $s$. The spring, however, is preferably so designed that, at the highest torsional stress exerted on it in operation, the convolutions of the spring are not completely in contact one with another.

The stated relationship between the axial compressibility and the diameter of the spring determines the pitch of the spring, the angle of which must not exceed 6° and is preferably between 1½° and 3°.

As may be seen from the drawing, the gap between the outer surface of the sleeve $h$ and the spring is sufficient to permit an angular deviation of 15°, which is the maximum deviation necessary for the Cardan shafts of motor cars. The spring is not prevented by means of supports from bulging outwards, yet it does not bulge outwards when compressed. The axially displaceable end pin $g$ may be on either of the shafts.

As shown in Figure 2, the end pin $g$ may be carried in rubber shock-absorbing rings. Preferably, two rubber shock-absorbing rings $m_1$ and $m_2$ are provided at each side of a rib $h_2$ in the sleeve $h$. These rings lie between the end face of the end $n$ of the shaft $e_2$ and the head $g_1$ of the end pin $g$ which is screwed into the shaft $e_2$.

The rubber shock-absorbing ring can also be fitted between two ribs of the sleeve, in which case the pin $g$ which projects through the aperture in the shock-absorbing ring bears by means of two flanges which are preferably conical, against the faces of the shock-absorbing ring.

What we claim is:

1. In a universal joint, a driving shaft and a driven shaft, an edgewise wound single coil spring as the only member of torque transmission from the driving shaft to the driven shaft allowing a maximum compression stroke less than the external diameter of the spring, the ends of said spring being connected to the opposite ends of said driving and driven shaft respectively, a tubular extension on the end of one shaft projecting into the interior of the spring beyond the middle of its length, a pin at the end of the other shaft projecting into the hollow of said tubular extension beyond the middle of the spring and a link connecting the pin and tubular extensions of said shafts substantially at the middle of the length of the spring in a manner to permit a torsional angular and longitudinal displacement of the driven shaft with respect to the driving shaft and said spring having a cross section whose radial width is at least four times the axial thickness.

2. In a universal joint, a driving shaft and a driven shaft, an edgewise wound single coil spring with an external angle less than 6° preferably between 1½ and 3° as the only member of torque transmission from the driving shaft to the driven shaft allowing a maximum compression stroke less than the external diameter of the spring, the ends of said spring being connected to the opposite ends of said driving and driven shafts respectively, a tubular extension on the end of the one shaft projecting into the interior of the spring beyond the middle of its length, a pin at the end of the other shaft projecting into the hollow of said tubular extension beyond the middle of the spring and a link connecting the pin and tubular extensions of said shafts substantially at the middle of the length of the spring in a manner to permit a torsional angular and longitudinal displacement of the driven shaft with respect to the driving shaft and said spring having a cross section whose radial width is at least four times the axial thickness.

3. A universal joint comprising an edgewise wound coil spring, flange members connected to the ends of said spring, a tubular extension connected to one flange member extending into the spring coil, a pin extension connected to the other flange member extending into said tubular extension, a link having spherical bearing surfaces between said tubular and pin extensions and sliding bearing surfaces between said spherical bearing surfaces and at least one of said extensions allowing a longitudinal displacement of said extension accompanying the torsion of the spring coil about its axis.

ROBERT DÖME
PAUL JAROSS